Patented May 31, 1927.

1,630,579

UNITED STATES PATENT OFFICE.

CALEB PAYNE, OF CHICAGO, ILLINOIS, ASSIGNOR TO GYPSUM ENGINEERING & MANUFACTURING CO., OF CHICAGO, ILLINOIS, A CORPORATION OF ILLINOIS.

METHOD OF MAKING GYPSUM STUCCO BLOCKS AND THE LIKE.

No Drawing. Application filed October 11, 1924. Serial No. 743,136.

This invention relates to the art of manufacturing blocks from gypsum stucco for building and other purposes, and its object is generally to increase the density and strength of the block and to facilitate the manufacture by reducing the time which must elapse before the block can be handled.

It is well known that if gypsum stucco is mixed with water to a desired consistency and allowed to stand, it will crystallize and set to a hydrated mass. During this process the stucco passes through a stage commonly referred to as the "initial set" which identifies a condition when the water, mixed with the stucco, goes to hydration and the surplus water is freed. In other words I mean by initial set that stage in the process of making gypsum stucco blocks or other products during which hydration is going on and before crystallization is completed.

I have discovered that a very dense block can be obtained by compacting the needles of crystallization and squeezing out the surplus water, if this is done during the initial set. It is impossible to perform the compacting step before initial set because until this time there is no separation of the surplus water; and it is likewise impossible to perform this compacting step after initial set because then crystallization has set up and any attempt to compact at this stage would destroy the newly formed crystals.

I contemplate the use of pressure in any suitable form for the compacting step. For example, if the stucco is in a box or compartment or mold, cores may be thrust into the stucco mass at the initial set to compact the mass and force out the surplus water. Other means for performing the compacting step will readily occur to those skilled in the manufacture of gypsum blocks, and I consider the foregoing a sufficient explanation of one means whereby this can be efficiently performed.

I have also found that by subjecting the stucco to the compacting step at initial set not only is a very dense and much stronger block produced, but the setting stage is hastened, whereas according to the old method of making gypsum stucco blocks, which is much slower, the surplus water which remains in the mass retards the set of the crystals, and tends to lessen the quality of the product by dissolving newly formed crystals.

A gypsum stucco block made in accordance with my improved method is much denser than a block made in the customary way, and therefore it can be handled before setting is complete and, in fact, immediately after the compacting step has been completed. This greatly facilitates the manufacture of the blocks, saves time, and reduces the cost, while at the same time the product is improved in quality and in strength.

I estimate that about twenty five per cent by weight of water is required to effect crystallization, but in general commercial practice it has been the custom to use from forty to fifty per cent, sometimes more and sometimes less. This apparent excess of water is required to obtain the proper working conditions, and it is this excess which I seek to eliminate by the compacting step hereinbefore described after it has served its purpose. By this method I am able to proceed with an excess of water in the old way to obtain the benefits of such excess in satisfactory working conditions, and then to eliminate this excess of water after it has served its purpose, so that a hard, dense, strong and substantial block may be obtained easily. When this excess of water is allowed to remain in the block according to the well known methods of manufacture, it tends to dissolve newly formed crystals, and thereby lessen the quality of the block, as heretofore mentioned, and also delays completion of the operation; but by my method the surplus water is eliminated at a time when it has served its purpose and before it can do any harm, and by this elimination I also reduce the time required for the complete operation. This enables an operator to remove the block from the mold much earlier than he would according to the old method, and thereby more blocks can be made in a given time in the mold, and the efficiency of the process is increased.

I claim:

1. The herein described method of making gypsum stucco blocks and the like which consists in confining the mass during hydration and subjecting the mass at the time of initial set to a substantial amount of pressure, thereby compacting the mass and eliminating surplus water.

2. The herein described method of making gypsum stucco blocks and the like which consists in confining the mass during hydration and subjecting the confined mass to pressure internally at the time of initial set to eliminate surplus water.

3. The herein described method of making gypsum stucco blocks and the like, which consists in mixing the stucco with water, introducing the mixture into a mold and allowing it to reach initial set, and removing the surplus water at the time of initial set and before crystallization is completed.

CALEB PAYNE.